United States Patent
Zubko

(10) Patent No.: US 6,626,622 B2
(45) Date of Patent: Sep. 30, 2003

(54) COMPOSITE SIDEWALL PANELS FOR CARGO CONTAINERS

(75) Inventor: Ronald Zubko, Knoxville, TN (US)

(73) Assignee: Strick Corporation, Fairless Hills, PA (US)

(*) Notice: Subject to any disclaimer, the term of this patent is extended or adjusted under 35 U.S.C. 154(b) by 0 days.

(21) Appl. No.: 09/767,767

(22) Filed: Jan. 23, 2001

(65) Prior Publication Data

US 2002/0098053 A1 Jul. 25, 2002

(51) Int. Cl.$^7$ ................................................. B60P 7/08
(52) U.S. Cl. .................. 410/113; 410/106; 410/108; 410/112; 410/115; 410/116; 410/109; 296/181; 296/191; 52/582.1; 52/520
(58) Field of Search ............................... 410/106, 108, 410/115, 116, 112, 113, 114, 109; 296/181, 183, 191; 220/1.5; 52/582.1, 520, 540, 794.1, 584.1, 309.1, 309.2, 309.4

(56) References Cited

U.S. PATENT DOCUMENTS

| | | | |
|---|---|---|---|
| 3,034,824 A | | 5/1962 | Schubach |
| 3,393,920 A | | 7/1968 | Ehrlich |
| 4,037,379 A | | 7/1977 | Ozanne |
| 4,266,897 A | * | 5/1981 | Jensen ........................ 410/113 |
| 4,357,047 A | | 11/1982 | Katz |
| 4,420,183 A | | 12/1983 | Ozanne ....................... 410/144 |
| 4,455,807 A | | 6/1984 | Ehrlich |
| 4,553,888 A | | 11/1985 | Crissy et al. |
| 4,685,721 A | | 8/1987 | Bannerjea |
| 4,810,027 A | | 3/1989 | Ehrlich |
| 4,904,017 A | | 2/1990 | Ehrlich |
| 4,940,279 A | | 7/1990 | Abott et al. |
| 4,958,472 A | | 9/1990 | Ehrlich |
| 5,020,948 A | * | 6/1991 | Ihara ........................... 410/105 |
| 5,286,079 A | | 2/1994 | Zubko et al. |
| 5,439,266 A | | 8/1995 | Ehrlich |
| 5,492,747 A | | 2/1996 | Kemp et al. |
| 5,509,714 A | | 4/1996 | Schmidt |

(List continued on next page.)

FOREIGN PATENT DOCUMENTS

| | | |
|---|---|---|
| AT | 71023 | 12/1916 |
| CH | 76894 | 11/1917 |
| DE | 252395 | 10/1912 |
| DE | 354626 | 2/1919 |
| DE | 498308 | 6/1928 |
| DE | 1 064 228 | 5/1957 |
| FR | 521.697 | of 1921 |
| FR | 1233563 | 3/1959 |
| GB | 383129 | 2/1932 |
| GB | 492963 | 3/1938 |
| NL | 40841 | 3/1934 |

Primary Examiner—Stephen T. Gordon
(74) Attorney, Agent, or Firm—Drinker Biddle & Reath LLP

(57) ABSTRACT

A sidewall for a cargo container is provided having at least one pair of composite panels joined together. Each composite panel includes an inside and an outside face member, each member having a body portion and at least one joint portion. The inside face member of each composite panel has an inclined portion connecting the body and at least one joint portions. At least one joint portion of the inside face member of each composite panel is parallel to and abuts a joint portion of the outside face member of the composite panel, each composite panel having a core member sandwiched between and bonded to the body portions of the inside and outside face members. Adjacent composite panels are joined at an outer surface of a joint portion of the first or second member of a first composite panel which overlaps and abuts an outer surface of a joint portion of the first or second member of a second composite panel. The first composite panel and second composite panel are joined through logistics plate.

27 Claims, 6 Drawing Sheets

U.S. PATENT DOCUMENTS

| | | | |
|---|---|---|---|
| 5,562,981 A | 10/1996 | Ehrlich | |
| 5,700,118 A | * 12/1997 | Bennett et al. | 410/113 |
| 5,752,791 A | 5/1998 | Ehrlich | 410/101 |
| 5,774,972 A | 7/1998 | Ehrlich | |
| 5,860,693 A | 1/1999 | Ehrlich | |
| 5,876,089 A | 3/1999 | Ehrlich | |
| 5,934,849 A | * 8/1999 | Haire | 410/113 |
| 5,992,117 A | 11/1999 | Bubka | |
| 6,010,020 A | * 1/2000 | Abal | 220/1.5 |
| 6,402,446 B1 | * 6/2002 | Nadherny et al. | 410/100 |
| 6,412,854 B2 | * 7/2002 | Ehrlich | 296/191 |

* cited by examiner

COMPOSITE SIDEWALL PANELS FOR CARGO CONTAINERS

FIELD OF THE INVENTION

The invention pertains to trailers and other containers for moving cargo and, more particularly, to sidewalls for cargo containers comprising composite panels.

BACKGROUND OF THE INVENTION

Multi-panel constructions of the sidewalls of a trailer housing are known. A typical trailer 10 employing such construction is shown in FIG. 1. Such a trailer generally comprises a floor 14, a roof 16, a front wall 18, a pair of sidewalls 22, a rear cargo door (not shown), landing gear 24, and a wheel support assembly 26. Each sidewall 22 and front wall 18 comprises a plurality of composite panels 12. Preferably, each composite panel is rectangular, having a height greater than its width. Although the composite panels are shown in FIG. 1 as being relatively equal in size, the width and thickness of each panel may vary.

FIG. 2 shows a prior art construction of a composite panel 12 and a method of joining or splicing adjacent panels to form the sidewalls 22 and the front wall 18. Composite panel 12 comprises a laminated sandwich including a plastic core 28 and aluminum face sheets 30 adhesively attached to each surface thereof. As shown in FIG. 2, adjacent composite panels 12 are joined by means of an external aluminum splice plate 32 riveted thereto by vertical rows of rivets 34. The inside and outside wall surface of each panel are generally planar (i.e., lying in a plane), although the rivet heads 34 are shown as protruding.

In the construction of trailers and other cargo carriers, it is important to maximize space within the interior of the housing for the purpose of carrying cargo. In that regard, it is desired that the walls of the housing, in particular the internal sidewalls, be free from any protrusion or obstructions that could impinge cargo space. Turning to the prior art, elimination of the spacer 32 at the edges of panels 12 would have the advantage of removing such protrusions and obstructions in the cargo area. It also is desired to have the rivet heads recessed and the edges of the inside sheets curved inward so as not to be caught and torn by the fork lifts or cargo.

It is further desired to provide mounting points along the interior of the cargo container. Such mounting points may be obtained by incorporating a logistics plate into the joining means between adjacent composite panels. The use of the offset portions to form a recessed pocket between adjacent panels allows the logistics plate to be recessed from the interior surface of the container. The logistics plate can also be integrated with the composite panels via the same joining means which connects the adjacent panels.

It is further desired to have a scuff plate interconnected to the inside of each sidewall 22 in a simple yet structurally sound manner to provide a relatively smooth surface facing the interior of the cargo container that will not entangle any cargo or equipment used to load or unload cargo. Such a scuff plate is disclosed in U.S. Pat. No. 5,509,714 to Schmidt which is herein incorporated by reference.

SUMMARY OF THE INVENTION

The present invention relates to a sidewall for a trailer or other cargo container comprising at least one pair of composite panels and means for joining the composite panels. The composite panels include an inside face member, an outside face member, and a core contained between the inside and outside face members. The inside and outside face members include body portions in the area of which the face members are separated by the core, and joint portions in the area where the inside and outside face members are in contact with each other. The joint portion of the outside face can be co-planar with the body portion of the outside face. The joint portion of the inside layer is offset from the body portion towards the outside face member. This offset allows the joining means to be below the plane of the body portion of the inside face member. The joining means takes the form of a multi-level logistics plate. The logistics plate may be adapted to allow cargo restraints to be connected to the side walls of the container.

In one embodiment, each composite panel includes an outside face member having co-planar body and joint portions. An inside face member is provided, having an inclined portion between body and joint portions of the inside face member. The inclined portion offsets the joint portion so that it is in contact with and parallel to the joint portion of the outside face member; and a core member sandwiched between and bonded to the body portions of the inside and outside face members. The outside face member has outer and inner surfaces. The inside face member also has inner and outer surfaces. The inner surface of the joint portion of the outside face member abuts the parallel inner surface of the joint portion of the inside face member. The inclined portion of the inside face member is angled with respect to the body and joint portions. This construction forms a sandwich around the core and an edge which is stepped or offset inwardly at the joint portion of the inside face member. Preferably, two composite panels are positioned adjacent one another with the stepped edges overlapping. The pair of panels are joined at a point where the outer surface of the outside face member of one panel abuts the outer surface of the joint portion of the inside face member of the other panel. The joining means may comprise welding, rivets or the like, and incorporates a logistics plate.

The logistics plate preferably comprises an open ended trapezoid shaped cross section with extensions from the non-parallel sides of the cross section. Slots may be provided in the center section of the trapezoid. The slots are formed to allow for rapid connection of fasteners on the ends of straps or other restraints. The sidewall constructions contemplated may be combined with a scuff plate fastened to the bottom of the container. The scuff plate may include an upward extending flange that protects the inside lower surface of the panels during the loading of cargo.

BRIEF DESCRIPTION OF THE DRAWINGS

For a better understanding of the present invention, reference is made to the accompanying drawings. The drawings show alternate embodiments of the joint structure between adjacent composite panels and logistics plates. However, it should be understood that the invention is not limited to the precise arrangements and instrumentalities shown in the drawings.

DETAILED DESCRIPTION OF THE DRAWINGS

Figure 1:
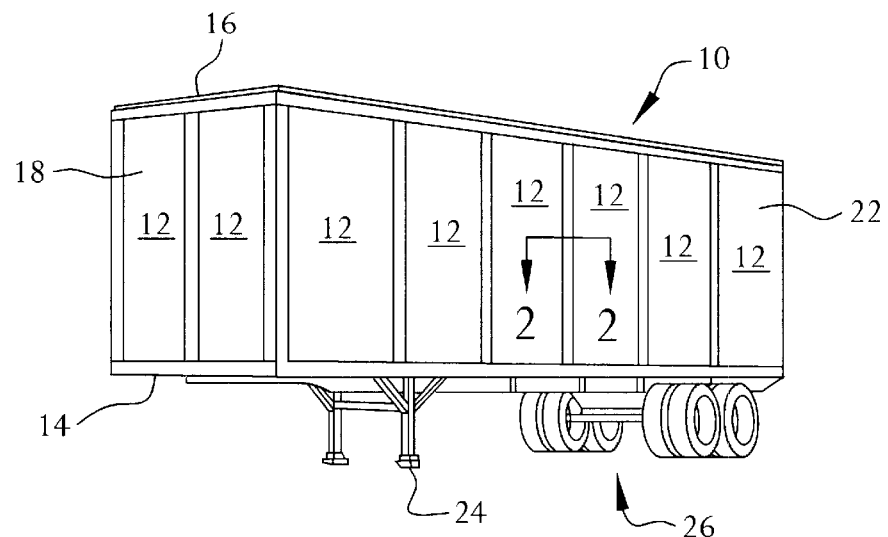
FIG. 1 is a perspective view generally showing a trailer, which is one type of cargo container that may incorporate the features of the present invention.
Figure 2:
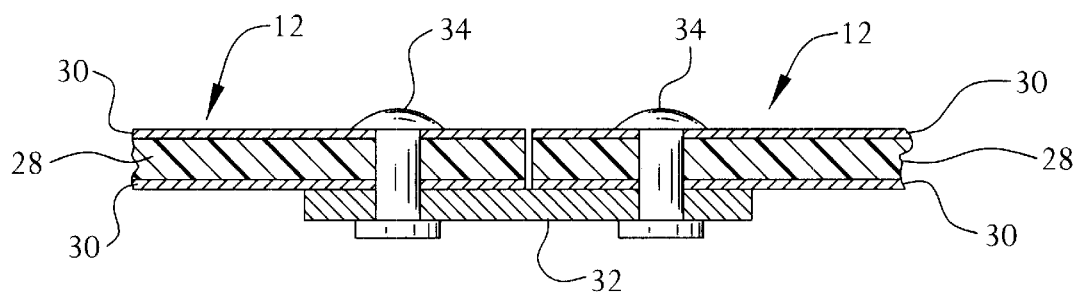
FIG. 2 is a partial cross-sectional view of a prior art composite sidewall construction as taken along line 2—2 in FIG. 1.

Referring to the drawings, wherein like numerals indicate like elements, FIG. 1 shows a perspective view of a trailer 10. The present invention is not restricted to a trailer, but more broadly relates to the construction of cargo containers, including trailer bodies adapted to be hauled by tractor units (not shown). The terms "container" and "cargo container" are used interchangeably herein and each such term is meant to designate a partially-closed or closed, hollow structure for carrying cargo. The trailer 10, as illustrated in FIG. 1, includes provisions at the base thereof for a running gear 26 and a landing gear 24. The trailer 10 includes a roof 16, a floor 14, a front wall 18, a pair of sidewalls 22, and a rear cargo door (not shown). The trailer support assembly or running gear 26 is positioned adjacent the rear end of the trailer. The landing gear 24 is positioned forward of the running gear 26 and is used to support the trailer when a tractor is not attached.

The trailer sidewall 22 includes a plurality of vertical upstanding composite side panels 12. Each composite panel has a predetermined length, height, width and thickness. In the embodiment shown in FIG. 3a, which is in accordance with commonly assigned U.S. Pat. No. 5,992,117, herein incorporated by reference, each composite panel 12 includes an outside face member 36 having a body portion 38 and at least one joint portion 40; an inside face member 42 having a body portion 38 and at least one joint portion 40, and an inclined portion 44 connecting the body portion 38 and the joint portion 40, and a core member 46. The core member 46 is sandwiched between and preferably bonded between the body portion 38 of the outside face member 36 and the body portion 38 of the inside face member 42. The joint portions 40 of the inside 42 and outside 36 face members are parallel to and abut each other.

Each face member 42 has an inner surface 48 and an outer surface 50. The body portion 38 and joint 40 portions of the outside face member 36 are co-planar. The body portion 38 of the outside face member 36 is positioned parallel to the body portion 38 and joint 40 portions of the inside face member 42 with the core 46 positioned between the body portions 38 of the outside face member 36 and inside face member 42.

The outer surface 50 of the outside face member 36 forms the exterior surface of the trailer. The inner surface 48 of the outside face member 36 directly contacts the core 46 and the joint portion 40 of the inside face member 42. The interior surface of the container is formed by the outer surface 50 of the inside face member 42. The inclined portion 44 and joint portion 40 of the inside face member 42 form a step or offset in the interior surface of the container. By forming the sidewall panel 12 with a step, two adjacent panels may be attached to one another without a projecting edge beyond the inside surface of the sidewall 22.

Joining means 52 is provided at a joint where the joint portions 40 of adjoining panels 12 overlap. As illustrated, the joining means 52 is a series of rivets. The rivets (e.g., 3/16 rivets on 2" centers) are preferably positioned along the overlapping edges of the panels. Alternatively, adhesive bonds, threaded fasteners, seam welding, or spot welding along the joint may be used.

The joinder of the composite panels 12 includes a logistics plate 54. A logistics plate provides structural mounting points for attaching restraints to the container wall. The mounting points can include apertures through the logistics plate 54 for connecting restraints, or can use the shape of the logistics plate to provide a connectable feature for attaching restraints.

Figure 3A:
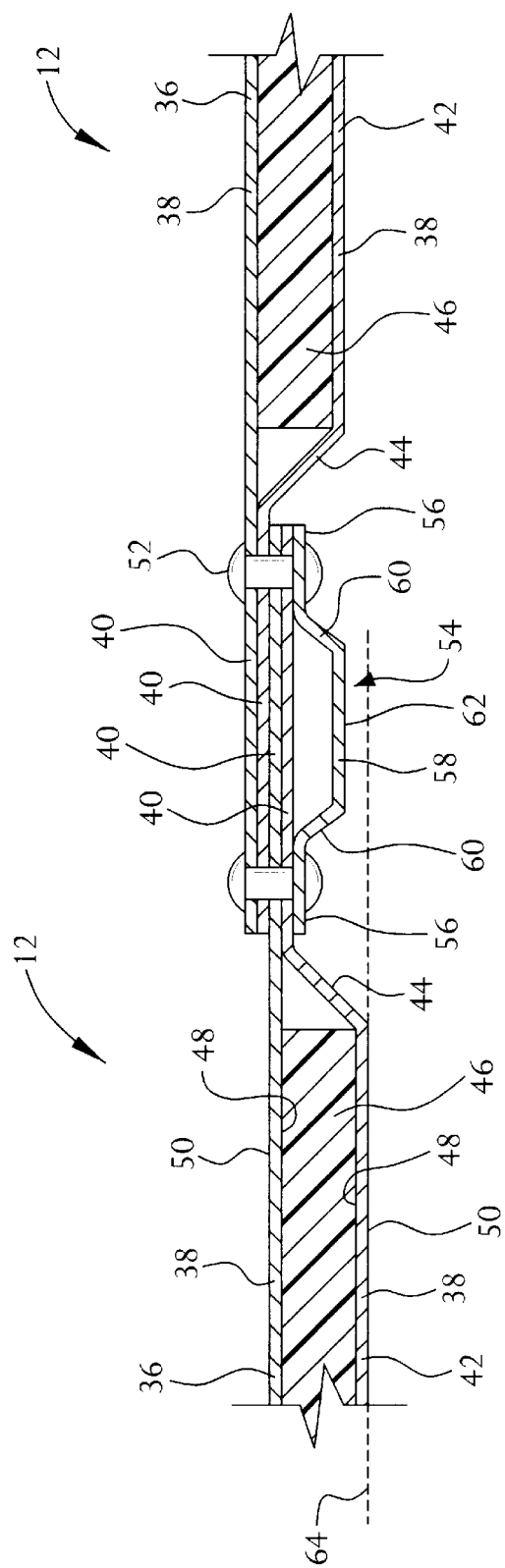
FIG. 3a is a partial cross-sectional view of an embodiment of the sidewall construction of the present invention.
Figure 3B:
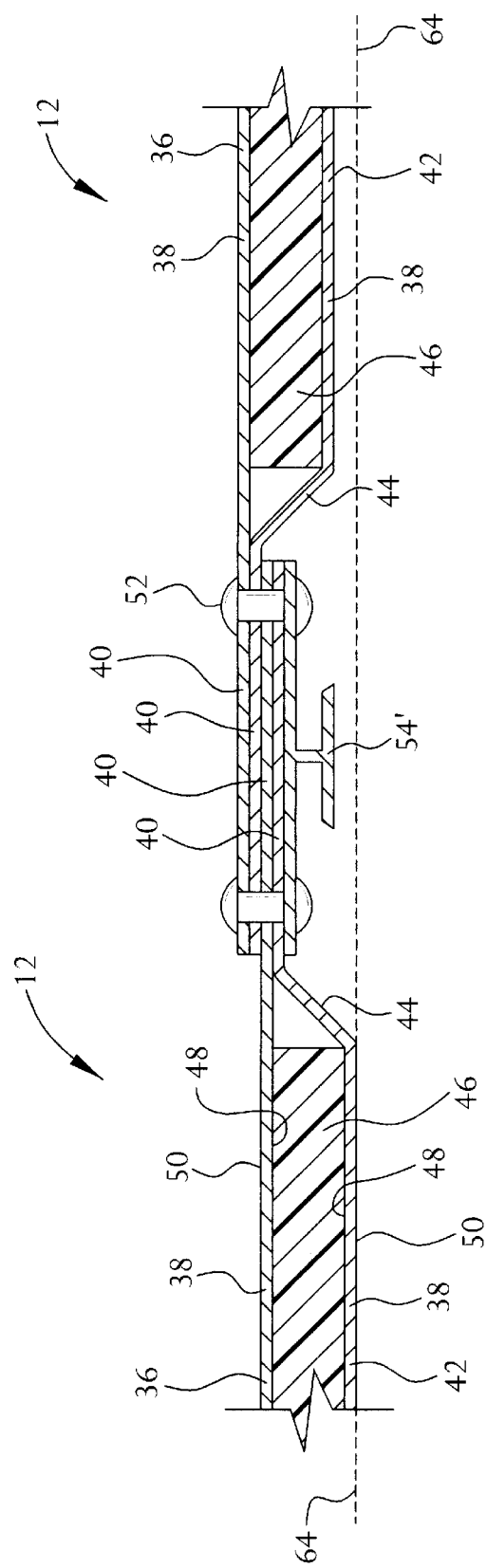
FIG. 3b is a partial cross-sectional view of a similar embodiment to FIG. 3a incorporating an alternate logistics plate.

The logistics plate 54 as illustrated in FIG. 3a is an open trapezoidal-section channel, including two mounting feet 56 joined to a face 58 by inclined legs 60. The logistics plate 54 is joined to the composite panels 12 by extending the joining means 52 through the feet 56 of the logistics plate 54. An outer surface 62 of the face 58 forms a section of the interior surface of the container. Preferably, the logistics plate 54 is constructed so that the outer surface 62 of the face 58 does not extend beyond the plane 64 of the interior surface of the container. FIG. 3b shows a logistics plate 54' incorporating a tee-shaped center section to allow restraints to be attached to the logistics plate 54'. Other shapes for the logistics plate may also be used.

Figure 4:
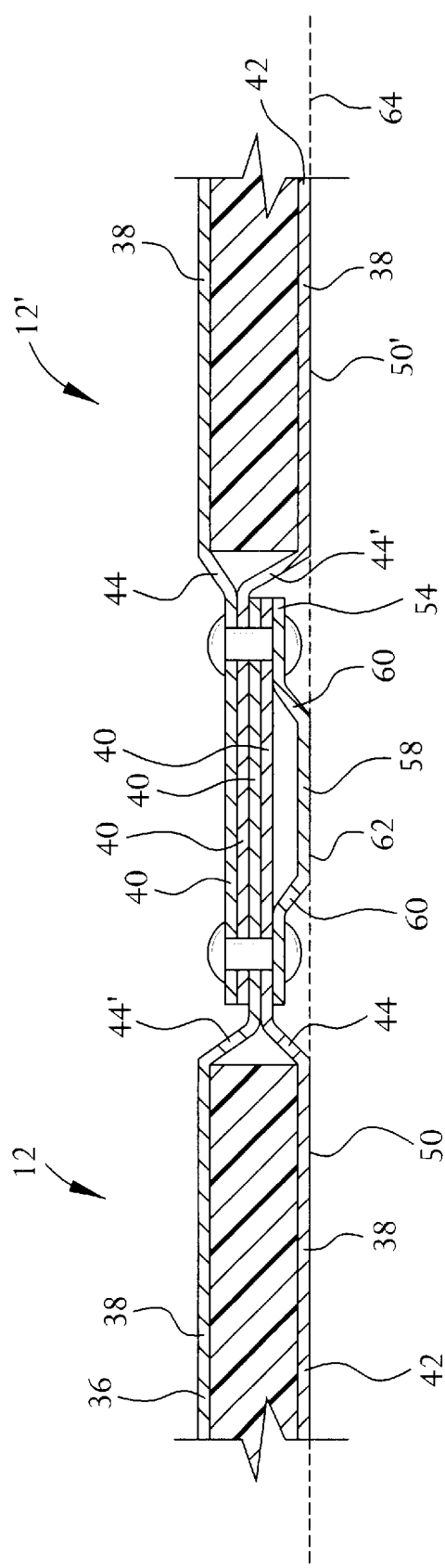
FIG. 4 is a partial cross-sectional view of an alternate embodiment of the sidewall construction incorporating a logistics plate.

FIG. 4 shows an embodiment of the present invention wherein the outside face member 36 has an inclined portion 44' connecting the body portion 38 and joint 40 portions of the outside face member 36. The inclined portion 44' illustrated differs in angle from the inclined portion 44 of the inner face member 42. By differing the angles of the inclined portions 44 and 44', adjacent composite panels 12 and 12' can be joined to form an interior surface of the container wherein the outer surfaces 50 and 50' of the body portions 38 of the inside face members 42 are co-planar with the plane 64 of the interior surface of the container. The inclined legs 60 of the logistics plate 54 can also be sized to place the outside surface 62 of the face 58 co-planar with the plane 64 of the interior surface of the cargo container.

Figure 5:
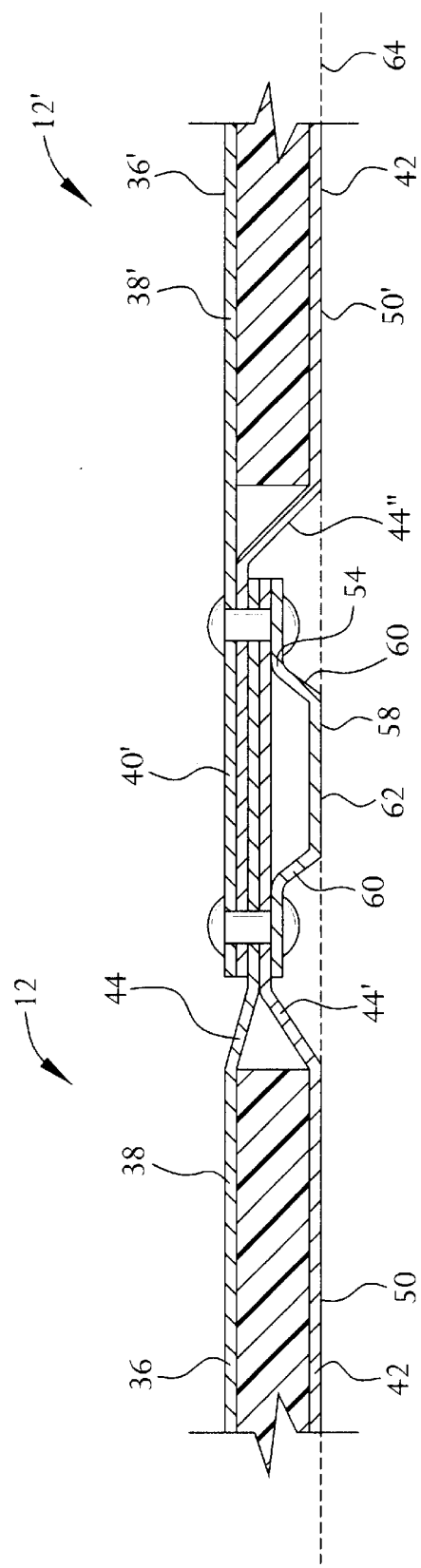
FIG. 5 is a partial cross-sectional view of an alternate embodiment of the sidewall construction incorporating a logistics plate.

FIG. 5 shows another embodiment, wherein the composite panels 12 and 12' differ in construction in the area of the joinder of the adjacent panels. The construction shown in FIG. 5 allows the recess formed by the inclined portions 44 and 44' and the joint portion 40 of the inside face member 42 of the first composite panel 12 to be as far below the plane 64 of the interior surface of the container as possible. This is accomplished by making the inclined portion 44" longer than the length of the inclined portion 44'. Such a deep recess provides latitude in the choice of shapes for the logistics plate 54. First composite panel 12 includes an outside face member 36 having an inclined portion 44 connecting the body 38 and joint 40 portions of the outside face member 36. The adjacent composite panel 12' includes an outside face member 36' wherein the body 38' and joint 40' portions of the outside face member are co-planar. As shown in the embodiment illustrated, this allows adjacent composite panels 12 and 12' to be joined to form an interior surface of the container wherein the outer surfaces 50 and 50' of the body portions of the inside face members 42 are co-planar with the plane 64 of the interior surface of the container. The inclined legs 60 of the logistics plate 54 can also be sized to place the outside surface 62 of the face 58 co-planar with the plane 64 of the interior surface of the cargo container.

Figure 6:
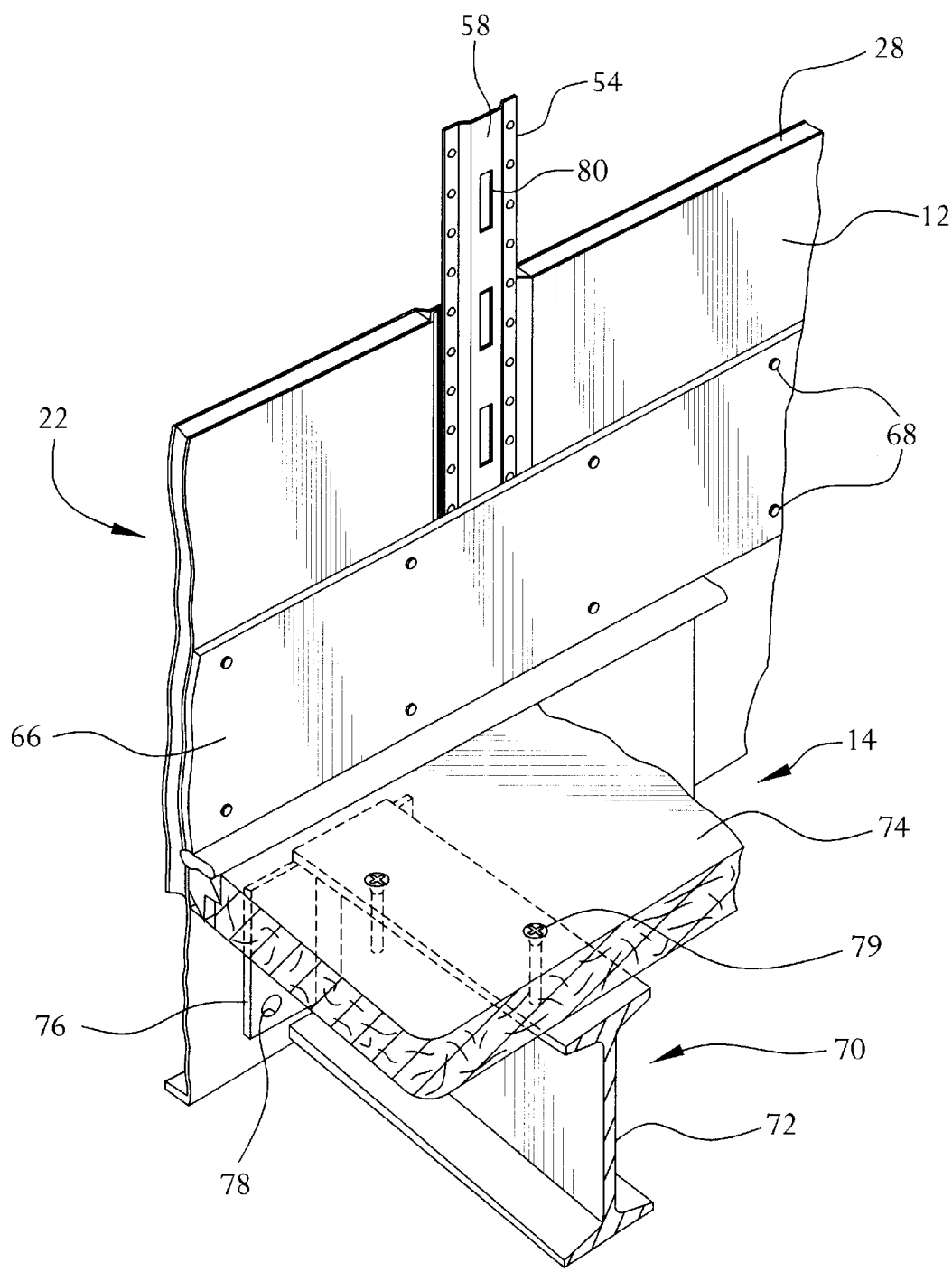
FIG. 6 is a partial perspective view of an embodiment of the sidewall construction of the present invention combined with a scuff plate and a floor assembly.

FIG. 6 shows the present invention combined with a scuff plate 66. Means 68 for fastening the scuff plate 66 to the overlapping panels 12 is provided in the form of at least one horizontal row of rivets (two rows being shown) preferably with low-profile heads located near the edges of the scuff plate 66. A floor 14 is supported by a sill assembly 70 which includes transverse I-beams 72 on which floor members 74 rest. The I-beams 72 have sill plates 76 at their ends which are connected to the side wall 22 by rivets 78. The floor 14 is connected to the transverse I beams 72 by screws 79.

Logistics plate 54 can be seen incorporated into the junction between two composite panels 12. The face 58 of the logistics plate 54 can incorporate slots 80 to allow the contents of the trailer 10 to be restrained. The use of such restraints is known in the art. If the face 58 of the logistics plate 54 does not extend beyond the plane 64 of the inner surface of the container, as shown in FIGS. 3–5, the logistics plate can extend the full length of the junction between adjacent panels 12, including behind the scuff plate 66. If the logistics plate extends beyond the plane 64 of the inner surface of the container, the logistics plate 54 can extend along the junction of the composite panels 12, with the junction of the composite panels 12 below the top of the scuff plate 66 incorporating only a joining means.

The overlapping panels 12 and the scuff plate 66 may be made of the same material, such as aluminum. The scuff plate is normally of a thicker gauge than the panels; however, if the scuff plate is made of a stronger material than that of the panels, for example, steel, or if the panels are made of a weaker material, for example, a plastic laminate, then the relative thickness ratio may be reversed (i.e., the panel thickness exceeds that of the scuff plate).

The scuff plate 66 may be of any height and preferably extends the length of the trailer 10. A scuff plate of unitary construction (i.e., one-piece) simplifies the assembly process of the trailer. The scuff plate may also be made of several pieces which are welded together. The scuff plate 66 serves to protect the composite panels during loading. As a fork lift moves cargo into the container, the lift truck or cargo contacts the scuff plate 66 rather than the panel 12. Thus, the panels may be thin skinned with a bonded plastic or foam core.

Although this description has been directed to the panels 12 of the sidewalls 22, it should be recognized that panels 12 with offset overlapping edges may also be used to provide the front wall 18 of a trailer 10 or other cargo carrier. In such an arrangement, means may be provided to allow for access in the rear (not shown) of the trailer or cargo carrier.

The offset positioning of the joint between the panels serves to protect the panels since the fastening means on the inside is recessed below the inside surface. A cargo and fork lift is therefore less likely to peel off the joint during loading and unloading. Preferably, the connection between the inclined portion and the body and joint portions of the inside panel members are rounded making them less likely to be engaged or torn.

As noted above, one of the objects of the present invention is to reduce the likelihood of damage to a surface of the container by creating a recessed joint between the panels forming the surface. This allows the joining means to be below the plane of the surface. It is preferred that the face of the logistics plate be recessed or co-planar as well.

The above descriptions are not intended to limit the application of the invention to creating the recessed joint only on the interior of a container. If the exterior surface is of greater concern for snag hazards, the inside face member described above can function to form the exterior surface of the container. If both interior and exterior surfaces need to be smooth, the embodiment of FIG. 4 can is adaptable to provide recesses on both sides of the container wall, with the logistics plate on the side requiring restraining points, or if required installed on both sides of the container wall.

The present invention may be embodied in other forms where the variation does not substantially differentiate from the essential novelty and uniqueness revealed in the foregoing disclosure. Reference should therefore be made to the appended claims rather than the foregoing specification, as indicating the scope of the invention. It should be understood that many modifications, variations and changes may be made without departing from the spirit and scope of the invention as defined in the claims.

What is claimed is:

1. A sidewall for a cargo container comprising:
   a first composite panel,
   a second composite panel,
   joining means for joining the composite panels,
   a logistics plate for aiding in the joining of the panels,
   each composite panel comprising
   a) an outside face member having an outer surface and an inner surface, the outside face member having a body portion and at least one parallel joint portion, outside face member body portion having an inner surface and an outer surface, the outside face member joint portion having an inner surface and an outer sutface,
   b) an inside face member having an outer surface and an inner surface, the inside face member having a body portion and at least one parallel joint portion, the inside face member body portion having an inner surface and an outer surface, the inside face member joint portion having an inner surface and an outer sutface,
   c) a core member sandwiched between and bonded to the inner surface of the body portions of the outside face member and the inside face member,
   wherein the composite panels are joined by said joining means where the outer surface of the joint portion of the outside face member of the first composite panel abuts the outer surface of the joint portion of the inside face member of the second composite panel; and
   wherein the logistics plate is fixed by the joining means to the outer surface of the joint portion of the inside face member of the first composite panel, the joining means extending through the joint portion of the first composite panel, the joint portion of the second composite panel, and the logistics plate.

2. A sidewall for a cargo container according to claim 1, wherein the logistics plate comprises at least two feet members, at least one face member, and inclined legs connecting the foot members to the face member, the foot members abutting the outer surface of a joint portion of the inside face member of at least one of said first and second composite members.

3. A sidewall for a cargo container according to claim 2, wherein the body portion of the outside face member of the first composite panel is connected to at least one joint portion of the outside face member of the first composite panel by an inclined portion, the inclined portion being at an angle relative to the parallel body and joint portions of the outside face member of the first composite panel.

4. A sidewall for a cargo container according to claim 3, wherein the body portion of the of the outside face member of the second composite panel is connected to at least one joint portion of the outside face member of the second composite panel by an inclined portion, the inclined portion being at an angle relative to the parallel body and joint portions of the outside face member of the second composite panel.

5. A sidewall for a cargo container according to claim 2, wherein the outer surface of the body portion of the inside face member of the first composite panel is substantially co-planar with the outer surface of body portion of the inside face member of the second composite panel.

6. A sidewall for a cargo container according to claim 5, wherein the face of the logistics plate has an outer surface, the outer surface of the plate being substantially co-planar with the outer surfaces of the body portions of the inside face members of the first and second composite panels.

7. A sidewall for a cargo container as claimed in claim 2, wherein the face member of the logistics plate includes at least one aperture therethrough for connecting cargo fasteners.

8. A sidewall for a cargo container as claimed in claim 1, wherein the logistics plate is substantially planer with the body portion of the inside face member of each said panel.

9. A sidewall for a cargo container as claimed in claim 8, wherein the planer logistics plate further comprises a projection extending from a surface of the plate opposite of the surface of the inside face member of each said panel.

10. A sidewall for a cargo container according to claim 8, wherein the projection for the logistics plate comprises a "T" shaped cross section.

11. A sidewall for a cargo container according to claim 1 wherein the joining means comprises at least one rivet.

12. A sidewall for a cargo container according to claim 1 wherein the joining means comprises welding.

13. A cargo container comprising:
   a sidewall having
   a first composite panel,
   a second composite panel,
   joining means for joining the composite panels,
   a logistics plate for aiding in the joining of the panels,
   each composite panel comprising
      a) an outside face member having an outer surface and an inner surface, the outside face member having a body portion and at least one parallel joint portion, the outside face member body portion having an inner and outer surface, the outside face member joint portion having an inner surface and an outer surface.
      b) an inside face member having an outer surface and an inner surface, the inside face member having a body portion and at least one parallel joint portion, the inside face member body portion having an inner and outer surface, the inside face member joint portion having an inner surface and an outer surface,
      c) a core member sandwiched between and bonded to the inner surface of the body portions of the outside face member and the inside face member,
      wherein the composite panels are joined by said joining means where the outer surface of the joint portion of the outside face member of the first composite panel abuts the outer surface of the joint portion of the inside face member of the second composite panel; and
      wherein the logistics plate is fixed by the joining means to the outer surface of the joint portion of the inside face member of the first composite panel, the joining means extending through the joint portion of the first composite panel, the joint portion of the second composite panel, and the logistics plate.

14. A cargo container according to claim 13, wherein the logistics plate comprises at least two feet members, at least one face member, and inclined legs connecting the foot members to the face member the foot members abutting the outer surface of a joint portion of the inside face member of at least one of said first and second composite panels.

15. A cargo container according to claim 14, wherein the body portion of the outside face member of the first composite panel is connected to at least one joint portion of the outside face member of the first composite panel by an inclined portion, the inclined portion being at an angle relative to the parallel body and joint portions of the outside face member of the first composite panel.

16. A cargo container according to claim 14, wherein the body portion of the of the outside face member of the second composite panel is connected to at least one joint portion of the outside face member of the second composite panel by an inclined portion, the inclined portion being at an angle relative to the parallel body and joint portions of the outside face member of the second composite panel.

17. A cargo container according to claim 14, wherein the outer surface of the body portion of the inside face member of the first composite panel is substantially co-planar with the outer surface of the body portion of the inside face member of the second composite panel.

18. A cargo container according to claim 17, wherein the face member of the logistics plate has an outer surface, the outer surface of the plate being substantially co-planar with the outer surfaces of the body portions of the inside face members of the first and second composite panels.

19. A cargo container as claimed in claim 14, wherein the face member of the logistics plate includes at least one aperture therethrough for connecting cargo fasteners.

20. A cargo container as claimed in claim 13, wherein the logistics plate is substantially planer with the body portion of the outer surface of the inside face member of each said panel.

21. A cargo container as claimed in claim 20, wherein the planer logistics plate further comprises a projection extending from a surface of the plate opposite of the inner surface of the inside face member of each said panel.

22. A cargo container according to claim 21, wherein the projection for the logistics plate comprises a "T" shaped cross section.

23. A cargo container according to claim 13 wherein the joining means comprises at least one rivet.

24. A cargo container according to claim 13 wherein the joining means comprises welding.

25. A cargo container comprising:
   a series of sidewall panels forming a sidewall for the container, the panels having side edges and being positioned adjacent one another with the side edges overlapping,
   at least one side edge of each panel comprising
      a first planar surface,
      a second planar surface juxtaposed to the first planar surface, and
      the second planar surface integrally formed with an inclined portion which communicates with the remainder of the panel, the second planar surface being offset inwardly for the remainder of the panel,
   means for joining the panels, and
   a logistics plate for aiding in the joining of the panels.

26. A cargo container as claimed in claim 25 wherein the first planar surface is also offset inwardly from the remainder of the panel and is integrally formed with a second inclined portion.

27. A cargo container as claimed in claim 13 wherein the panels are of a composite construction having a core material positioned between two face members, the planar surfaces being a portion of the face members.

* * * * *